Patented Aug. 7, 1945

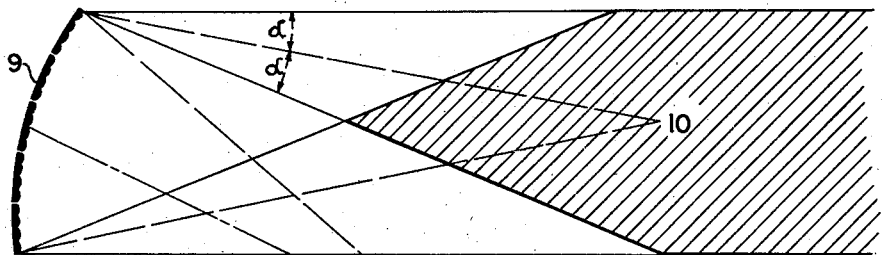
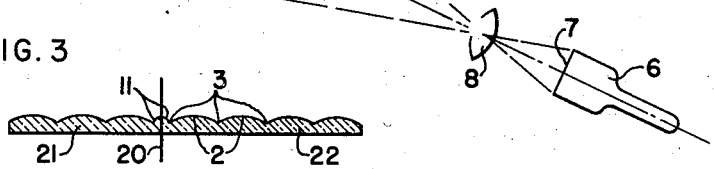
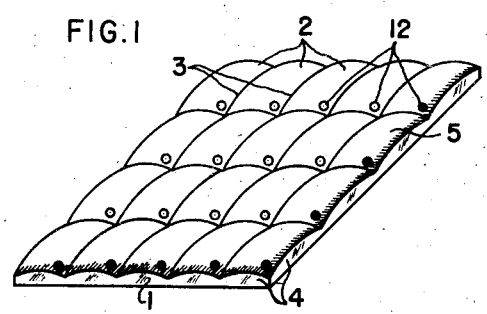
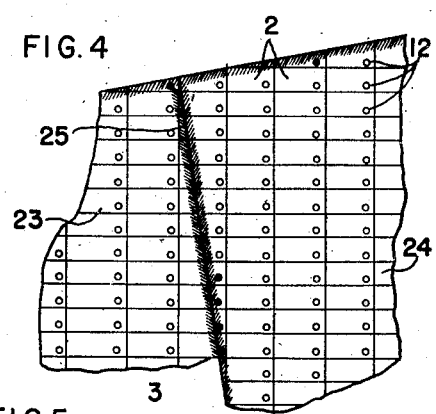
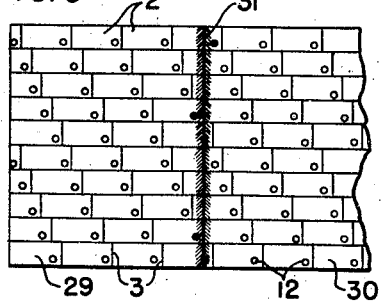
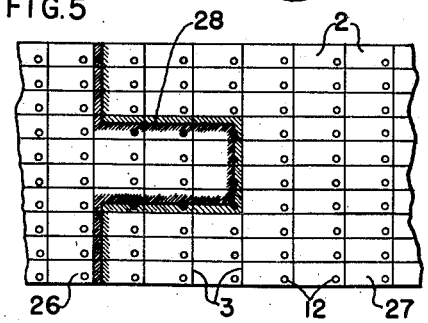

2,381,614

UNITED STATES PATENT OFFICE 2,381,614

PROJECTION SCREEN

Rolf Möller, Kleinmachnow, near Berlin, and Erich Kosche, Stuttgart W., Germany; vested in the Alien Property Custodian Application May 17, 1940, Serial No. 335,804
In Germany March 25, 1939

2 Claims. (Cl. 88—28.90)

This invention relates to projection screens and particularly to such screens having a directional effect.

Directional screens are employed when it is desired to direct into a predetermined space all the light of an optical image projected thereon. Screens of this type yield a high gain in light efficiency since all light reflected therefrom is directed into a useful viewing space wherein an audience may be seated. In screen constructions conventionally used, the screens are composed of a plurality of adjacent individual sections, each comprising a plurality of light-reflecting optical elements. These sections are preferably assembled to form a curved surface such as that of a concave mirror. Thus, when an optical image is projected upon a directional screen of the type described, comprising a multitude of optical elements, an enlarged bright image can be viewed thereon from within a predetermined solid angle or viewing space.

In the manufacture of the individual sections of the screen, the optical elements arranged along the margins thereof are often deformed. Such deformed elements may not reflect light in certain directions, so that they appear as black spots when viewed from a distance from corresponding angles. Since all optical elements along the margins of the sections can be so deformed that they do not direct light in certain directions, this causes a pattern of dark lines following the margins of the individual sections to become visible when viewing the screen from corresponding angles. This, of course, appreciably detracts from the quality of the projected image.

The object of the present invention, therefore, is to provide a new and improved projection screen for producing projected images of improved quality.

In accordance with the present invention, there is provided a projection screen comprising a plurality of individual adjacent sections, each of the sections comprising a plurality of complete optical elements and certain of the sections also having a plurality of incomplete optical elements at least at one margin thereof.

For a better understanding of the invention, together with other an further objects thereof, reference is had to the following description, taken in connection with the accompanying drawing, and its scope will be pointed out in the appended claims.

In the drawing, Fig. 1 is a perspective view of a screen section showing the optical elements thereon in greatly enlarged scale; Fig. 2 schematically shows a projection arrangement employing a directional screen consisting of a plurality of individual sections; Fig. 3 shows a cross-section through two adjacent individual sections; and Figs. 4, 5 and 6 show plan views of fragments of adjacent sections having their margins arranged in accordance with the present invention.

Referring now more particularly to Fig. 1 of the drawing, there is shown a screen section 1 comprising a plurality of optical elements 2 whose margins are indicated at 3. Two margins 4 of the screen section are shown and the shaded area 5 indicates the region along the margin in which the optical elements are deformed. Circles 12 indicate the areas of the optical elements which reflect light in a certain predetermined direction, the white circles indicating areas of optical elements effectively reflecting light in a predetermined viewing direction while the black circles, falling within the deformed shaded area, indicate corresponding areas of deformed optical elements which do not reflect light in this direction and are therefore ineffective.

Fig. 2 shows an arrangement for projection of optical images, comprising a television cathode ray receiver tube 6 having an image screen 7, a projection lens 8 and a directional projection screen 9.

In operation, an intense optical image is developed on the image screen 7 of the television cathode ray receiver tube 6. This image is projected by means of the projection lens 8 upon the directional projection screen 9, comprising a plurality of individual sections arranged to form the surface of a concave mirror. This surface is so designed that, if it were smooth, an image of the projection lens 8 would be produced at the point 10. Since each of the individual optical elements of the screen sections has a light-dispersing property and disperses light projected thereon into a solid angle of two α, as indicated in the drawing, the projection screen becomes visible with uniform brightness throughout when viewed from within the shaded area shown in the drawing. If, however, as explained before, certain optical elements do not reflect light in certain directions into the shaded area, these optical elements appear as dark spots in the projected image when viewed from certain angles from points within the shaded area. Furthermore, if the ineffective optical elements are arranged in a certain pattern, such as along the margins of the screen sections, a defined pattern of dark lines appears across the entire projected image.

In accordance with the present invention, the development of a defined interfering pattern of dark lines across the projected image is prevented by reducing the space occupied by ineffective optical elements or by more evenly distributing the ineffective optical elements over the projection screen and by interspersing groups of effective elements between groups of ineffective elements. This is accomplished by the use of screen sections shown in Figs. 3, 4, 5 and 6 of the drawing and explained below.

Fig. 3 shows a cross-section through two adjacent screen sections 21, 22 whose margins 20 do not coincide with the margins 3 between adjacent optical elements 2. Hence, there are provided at the margins of the screen sections two adjacent incomplete optical elements 11. While these incomplete optical elements may also not reflect light into certain predetermined directions, they do not produce a noticeable dark spot or line when viewing the screen from certain angles since the distance between adjacent light-reflecting optical elements is only increased by the space occupied by the incomplete optical elements 11. This, however, does not cause a sufficient reduction in brightness and dark lines are therefore no longer visible in the projected image.

Fig. 4 shows a plan view of fragments of two adjacent screen sections 23, 24 having a plurality of rectangular optical elements 2 having margins 3 forming a pattern of rectangular coordinates. The margins 25 of the screen sections are so arranged that they intersect this pattern of rectangular coordinates at an angle. The shaded areas again, as in Fig. 1, represent areas of deformation of the surfaces of the optical elements. Circles 12 again indicate the surface areas of the optical elements 2 reflecting light into a certain predetermined direction, the white circles indicating light-reflecting areas while the black circles, falling within the shaded area of deformation, indicate corresponding areas which do not reflect light in the same direction because of deformation of the optical elements. It may be seen from the drawing that, while certain optical elements do become ineffective for light reflection in certain directions, individual ineffective elements or groups thereof, are separated from each other by groups of effective optical elements. Considering the entirety of the projection screen, it is evident that the ineffective optical elements are more evenly distributed over the entire screen and therefore do not form a pattern of continuous dark lines.

A modification of the invention is shown in Fig. 5, which illustrates fragments of two adjacent screen sections 26, 27 comprising a plurality of rectangular optical elements 2. In this case, the margins 28 of the sections do not follow a straight line but are formed in a jigsaw-puzzle fashion. Again, the circles 12 indicate certain surface areas of the optical elements, the white circles indicating areas reflecting light in a certain predetermined direction while the black circles, falling within the shaded area along the section margins, indicate areas of deformed surfaces of optical elements which do not reflect light in the same direction. It is evident from the drawing that, while groups of ineffective optical elements appear, these groups are isolated from each other and therefore do not produce a defined pattern of dark lines in the projected image.

A further modification of the invention is shown in Fig. 6 which also shows fragments of two adjacent screen sections 29, 30 comprising a plurality of rectangular optical elements 2. In this case, the margins 31 of the screen sections run along a continuous straight line perpendicularly to the rows of optical elements 2; however, corresponding optical elements of adjacent rows are displaced with respect to each other, as shown. The circles 12, having the same significance as previously explained, show that groups of optical elements ineffective for the reflection of light in a certain predetermined direction are widely separated from each other by effective optical elements, whereby again the production of a defined pattern of dark lines in the projected image is prevented.

While there has been described what is considered practical embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A projection screen having a plurality of sections arranged in adjoining relation to abut each other, each section comprising corresponding adjacent rows of contiguous optical elements which extend across the section, each row of each section adjoining a corresponding row in an adjoining section and each row being made up of substantially uniformly formed optical elements which reflect light in a predetermined direction and of an incomplete and deformed optical element at the margin of the row which abuts the corresponding row of an adjoining section, the margin of each marginal element which abuts a marginal element in an adjoining section lying on a straight line inclined at an acute angle to the direction of the rows of optical elements.

2. A projection screen having a plurality of sections arranged in adjoining relation to abut each other, each section comprising rows of contiguous optical elements arranged to form a pattern of rectangular coordinates, said sections being positioned in abutting relation to each other with the respective rows of optical elements which extend across each section being located substantially in alignment with each other, the sectional margins between adjoining marginal optical elements in abutting sections cutting such marginal optical elements at different places in the successive rows of each section, providing a plurality of complete and substantially uniformly formed optical elements and also a plurality of incomplete optical elements which are deformed prior to assembly on the screen along the margins between abutting sections, each incomplete element of one section being complementary to the abutting incomplete element of the abutting section.

ROLF MÖLLER.
ERICH KOSCHE.